United States Patent
Stenberg

(10) Patent No.: US 8,845,306 B2
(45) Date of Patent: Sep. 30, 2014

(54) PUMPING SYSTEM

(75) Inventor: Johan Stenberg, Härnösand (SE)

(73) Assignee: Xavitech AB, Härnösand (SE)

( * ) Notice: Subject to any disclaimer, the term of this patent is extended or adjusted under 35 U.S.C. 154(b) by 511 days.

(21) Appl. No.: 12/990,326

(22) PCT Filed: Dec. 19, 2008

(86) PCT No.: PCT/SE2008/051532
§ 371 (c)(1),
(2), (4) Date: Oct. 29, 2010

(87) PCT Pub. No.: WO2009/134181
PCT Pub. Date: Nov. 5, 2009

(65) Prior Publication Data
US 2011/0044829 A1    Feb. 24, 2011

(30) Foreign Application Priority Data

May 2, 2008 (SE) ........................................ 0800988
May 15, 2008 (SE) ........................................ 0801094

(51) Int. Cl.
| | |
|---|---|
| F04B 47/08 | (2006.01) |
| B23P 17/00 | (2006.01) |
| F04B 43/02 | (2006.01) |
| H02K 33/10 | (2006.01) |
| F04B 43/04 | (2006.01) |

(52) U.S. Cl.
CPC .......... *F04B 43/02* (2013.01); *F04B 2201/0201* (2013.01); *H02K 33/10* (2013.01); *F04B 2205/01* (2013.01); *F04B 43/04* (2013.01); *F04B 2205/05* (2013.01)
USPC ........................... 417/413.1; 417/53; 417/395

(58) Field of Classification Search
CPC ...... F04B 43/02; F04B 43/04; F04B 43/0081; F04B 2201/0201; F04B 49/065
USPC ............................ 417/413.1, 63, 53, 395, 415
See application file for complete search history.

(56) References Cited

U.S. PATENT DOCUMENTS

| | | | |
|---|---|---|---|
| 5,201,641 A * | 4/1993 | Richer ........................... | 417/417 |
| 6,174,136 B1 | 1/2001 | Kilayko et al. | |

(Continued)

FOREIGN PATENT DOCUMENTS

| | | | |
|---|---|---|---|
| SE | 529284 C2 * | 5/2007 | |
| SE | 529328 C2 * | 5/2007 | |

(Continued)

*Primary Examiner* — Peter J Bertheaud
*Assistant Examiner* — Dominick L Plakkoottam
(74) *Attorney, Agent, or Firm* — Dilworth & Barrese, LLP.

(57) ABSTRACT

A pumping system comprising a membrane pump (1) for pumping a medium into or out of a vessel (6), the membrane pump comprising an actuating member (13) for moving a membrane (3) in a first direction from a first end position to a second end position against the action of a spring (12), the membrane being movable in the opposite direction from the second end position to the first end position under the action of the spring. The pumping system comprises sensing means (14) for generating a measuring value representing the location of said first end position of the membrane (3), and processing means (17) for establishing a pressure value representing the pressure inside a vessel (6) connected to an inlet (5) or outlet (24) of a pump chamber (4), the processing means (17) being adapted to establish said pressure value based on said measuring value.

20 Claims, 2 Drawing Sheets

(56) References Cited

U.S. PATENT DOCUMENTS

| | | | |
|---|---|---|---|
| 2005/0235733 A1* | 10/2005 | Holst et al. | 73/1.16 |
| 2005/0238497 A1* | 10/2005 | Holst et al. | 417/44.2 |
| 2007/0040454 A1* | 2/2007 | Freudenberger et al. | 310/12 |
| 2009/0047137 A1* | 2/2009 | Stenberg | 417/44.1 |
| 2009/0169402 A1* | 7/2009 | Stenberg | 417/413.1 |

FOREIGN PATENT DOCUMENTS

| | | |
|---|---|---|
| SE | 529284 C2 * | 6/2007 |
| SE | 529328 C2 * | 7/2007 |
| WO | 2007/055642 | 5/2007 |
| WO | 2007/058579 | 5/2007 |

\* cited by examiner

PUMPING SYSTEM

FIELD OF THE INVENTION AND PRIOR ART

The invention relates to a pumping system and method for establishing a pressure value according to the description herein.

Membrane pumps that apply negative or positive pressure are found in a large variety of forms and sizes and are used in many different applications, from large industry pumps to small pumps for medical purposes. What they all have in common is that the flow and pressure created by the pumps are induced by the oscillations of a membrane. The membrane can for instance be brought to oscillation by electromagnetic means alone or electromagnetic means in combination with a spring.

One important aspect of pumping systems in general, and also of pumping systems using membrane pumps, is to be able to measure the pressure in a vessel connected to the pump while pumping medium into or out of said vessel. This applies both to membrane pumps arranged to create a negative pressure in a vessel and membrane pumps arranged to create a positive pressure in a vessel. Usually a separate pressure detector is provided in the pumping system. An additional pressure detector gives the pumping system additional bulk and this prevents miniaturization of the pumping system. Furthermore, an additional pressure detector consumes power and thereby increases the power consumption of the pumping system, which can be of significant importance in some pumping systems, for instance pumping systems powered by batteries. Also, a pumping system with an integrated pressure detector is more economically favourable to manufacture than a pumping system with a separate pressure detector.

Sometimes it can be desired to have a pumping system arranged to pump medium into or out of a vessel while maintaining a certain pressure in the vessel. As long as the pressure lies within a certain pressure interval the pumping system does not need to pump medium into or out of the vessel, but as soon as the pressure starts to deviate from said pressure interval the pump needs to start again to maintain the desired pressure in the vessel. In order to do this, a pressure sensor needs to be provided in the pumping system. The pressure sensor should preferably be able to measure the pressure both while the pump is pumping medium into or out of the vessel and when the pump is not pumping.

WO 2007055642 A1 describes a membrane pump where an electromagnet is used for providing the pumping force of the membrane pump.

In this description the term "pumping force" should be interpreted as the force applied to the pump chamber in order to create a positive or negative pressure in a vessel connected thereto. For instance in a pumping system arranged to create a negative pressure in a vessel connected to the pump chamber of a membrane pump of said pumping system, the pumping force is the force applied to the membrane of the pump in order to expand the pump chamber to pump medium out from the vessel in which the negative pressure is created. Likewise, in a pumping system arranged to create a positive pressure in a vessel connected to the pump chamber of a membrane pump of said pumping system, the pumping force is the force applied to the membrane in order to contract the pump chamber to pump medium into the vessel in which the positive pressure is created.

WO 2007058579 A1 describes a control system for electromagnetic pumps. The control system is able to measure the pressure in a vessel connected to a pump chamber of a membrane pump in a pumping system, while pumping medium into or out of said vessel. Here, the pressure sensing is based on the acceleration of the movement of the membrane from a first end position to a second end position. This acceleration is dependent upon the pressure in the vessel, and from an acceleration value a pressure value representing the pressure in the vessel can be established. Therefore, in order for the pressure sensing to work, the pumping system needs to pump a medium into or out of a vessel. The pressure in the vessel can not be established while the pumping system is not pumping.

SUMMARY OF THE INVENTION

The object of the present invention is to provide a new and favourable pumping system and method, by means of which a pressure value representing the pressure in a vessel connected to a membrane pump can be established in a simple and reliable manner.

This object is according to the invention achieved by a pumping system and method having the features defined herein.

According to the invention:
the membrane of the membrane pump is movable by an actuating member in a first direction from a first end position to a second end position against the action of a spring and in the opposite direction from the second end position to the first end position under the action of the spring,
the pumping system comprises sensing means for generating a measuring value representing the location of said first end position of the membrane, and
the pumping system comprises processing means for establishing a pressure value representing the pressure inside a vessel connected to the inlet or outlet of the pump chamber, the processing means being adapted to establish said pressure value based on said measuring value.

The membrane is moving by the action of the spring from the second end position to the first end position. Since the stiffness of the spring is constant, the location of the first end position is dependent on the pressure in the pump chamber, hence the pressure in the vessel connected to the pump chamber. By providing sensing means as mentioned above, measuring values based on the location of the first end position of the membrane can continuously be established. The processing means utilizes tabulated pressure values corresponding to specific measuring values or a calculation model to determine the pressure in the pump chamber and a vessel connected thereto. In a situation when the pumping system is not actively pumping medium into or out of a vessel, the pressure inside the pump chamber is the same as it was when the pumping system stopped pumping. If the pressure decreases in a vessel connected to the outlet of the pump chamber, the pressure will also drop correspondingly in the pump chamber, and if the pressure increases in a vessel connected to the inlet of the pump chamber, the pressure will also increase correspondingly in the pump chamber. The change in pressure in the pump chamber results in a dislocation of the membrane in the first end position which will be registered by the sensing means, and the pressure in the pump chamber, hence in the vessel, can be established based on the present location of the first end position of the membrane. The membrane can of course act as the spring by itself, if for instance the membrane is made of a resilient material. Thus, the pumping system according to the invention is able to establish the pressure in a vessel connected to the pump chamber during pumping as well as while the pumping system is not pumping medium into or out of the vessel.

It should be noted that the use of a spring for providing the pumping force during pumping using a membrane is not common. Usually the pumping force is achieved by an actuating member connected to the membrane and driven by a piezoelectric or electromagnetic force.

According to an embodiment of the present invention, the membrane pump is arranged to pump medium into the vessel when the membrane is moved from the second end position to the first end position under the action of the spring so as to thereby create a positive pressure in the vessel.

According to another embodiment of the present invention, the membrane pump is arranged to pump medium out of the vessel when the membrane is moved from the second end position to the first end position under the action of the spring so as to thereby create a negative pressure in the vessel.

According to another embodiment of the present invention, the spring is a flat spring.

A flat spring is easily arranged in contact with the membrane of the membrane pump, preferably by attachment to an axle which is in direct contact with the membrane. Further, flat springs can be manufactured with very reproducible spring stiffness which is important since the accurate generation of the pressure value representing the pressure in the pump chamber is dependent upon the accurate determination of the stiffness of the spring.

According to another embodiment of the present invention, the sensing means comprises at least one optical sensor or another type of sensor.

By using an optical or an inductive sensor the location of said first end position of the membrane can be accurately established.

According to another embodiment of the invention, the sensing means comprises:
- an optical sensor and a light source placed inside the pump housing, and
- a shadowing element connected to the membrane and moving with the membrane during pumping, the shadowing element being situated partially between the optical sensor and the light source so as to block light from the light source to reach the optical sensor, the amount of light being blocked being dependent on the location of the shadowing element and thus also dependent on the location of the membrane.

The shadowing element can be a part of an axle directly connected to the membrane, or it can be a separate element directly connected to the membrane. The light source is situated in connection with the membrane pump and the optical sensor detects the light, i.e. the amount or intensity of the light, reaching the optical sensor from the light source. By the placement of the shadowing element between the light source and the optical sensor, the degree of shadowing determines the location of the membrane.

The present invention also relates to the use of a method according to the invention for establishing a volume value representing the volume of liquid in a vessel with a known inner volume, the membrane pump being arranged to pump a gaseous medium out of the vessel, wherein:
- a first pressure value representing the negative pressure inside the vessel is generated by the processing means at a first point of time,
- a certain number of pump strokes are performed by the membrane pump between said first point of time and a second point of time,
- a second pressure value representing the negative pressure inside the vessel is generated by the processing means at said second point of time, and
- said volume value is established based on a comparison between said first pressure value and said second pressure value.

In this description and the subsequent claims the term "pump stroke" refers to a full pump cycle with expansion and contraction of the pump chamber by moving the membrane from the first end position to the second end position and back again to the first end position.

In a vessel connected to the inlet of a membrane pump according to the invention, a certain number of pump strokes with the membrane pump will create a decrease in gas pressure in the vessel. The decrease in gas pressure, for instance expressed in a percentage pressure decrease, is dependent upon the gas volume of the vessel and the volume of the pump chamber of the membrane pump. If for instance the gas pressure in a vessel with a gas volume V decreases with P % after a certain number of pump strokes, the gas pressure of a vessel with the gas volume V/2 would decrease with 2P % after the same number of pump strokes. Thus, the gas volume in the vessel can be established by knowing the percentage decrease in gas pressure after a certain number of pump strokes and consequently the volume of a liquid in the vessel can be established by knowing the total volume of the vessel.

Other advantages and advantageous features of the invention will appear from the subsequent description.

BRIEF DESCRIPTION OF THE DRAWINGS

With reference to the appended drawings, below follows a specific description of embodiments of the invention cited as examples.

In the drawings.

DETAILED DESCRIPTION OF PREFERRED EMBODIMENTS OF THE INVENTION

Explained herein are preferred embodiments of the invention, describing the pumping system of the invention and the method for establishing a pressure value representing the pressure in a vessel connected to the inlet or outlet of a membrane pump. The invention may, however, be embodied in many different forms and should not be construed as being limited to the exemplary embodiments set forth herein; rather, these embodiments are provided so that this disclosure will be thorough and complete, and will fully convey the concept of the invention to those skilled in the art.

Figure 1:
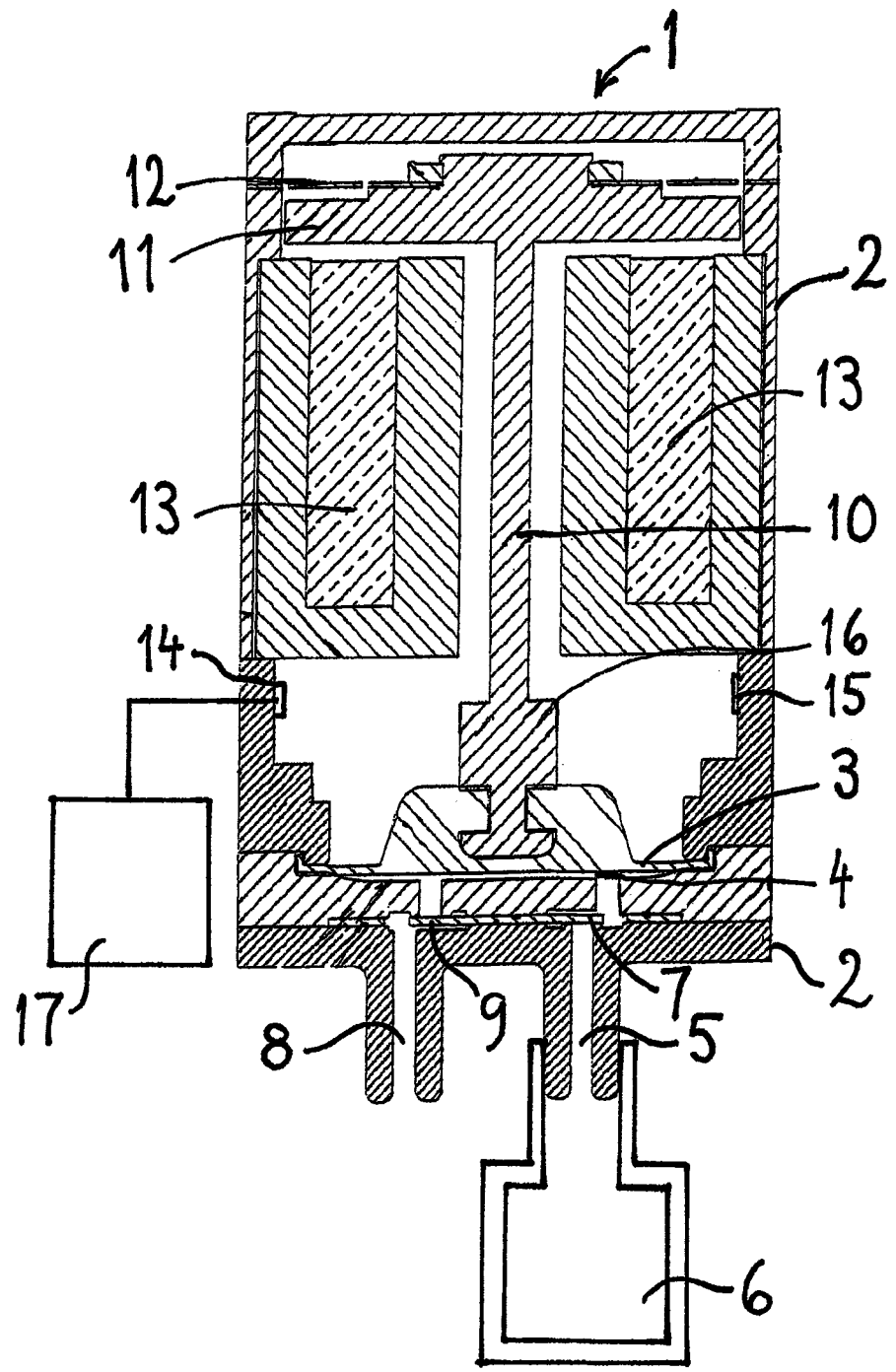
FIG. 1 shows a pumping system according to the invention, arranged to create a negative pressure in a vessel.

A pumping system according to the invention is very schematically shown in FIG. 1. The pumping system comprises a membrane pump 1 comprising a pump housing 2 to which a membrane 3 is mounted. The membrane 3 delimits a pump chamber 4 inside the pump housing 2. The pump chamber 4 has an inlet 5 for feeding medium into the pump chamber 4. A vessel 6 is connected to the inlet 5 and a first non-return valve 7 is located between said inlet 5 and said pump chamber 4. The pump chamber 4 also has an outlet 8 for discharging medium out of the pump chamber 4 and a second non-return valve 9 between the outlet 8 and the pump chamber 4. An axle 10 which has a protruding part 11 comprising a magnetic material is attached to the membrane 3. A flat spring 12 is attached to the axle 10, the spring connecting the axle 10 with the pump housing 2. One side of the protruding part 11 of the axle 10 is facing an actuating member in the form of an electromagnet 13; this side of the protruding part 11 of the axle 10 is also facing the pump chamber 4. The pumping system also comprises sensing means for establishing a measuring value representing the location of the membrane 3. An optical sensor 14 and a light source 15 are placed in the pump housing 2 on the respectively opposite side of a shadowing element 16. In the present embodiment, the shadowing element 16 constitutes a part of the axle 10, but it can also be a separate element in contact with the membrane 3. Processing means 17, for instance a microprocessor, for establishing a pressure value representing the pressure inside the vessel 6 connected to the inlet 5 of the pump chamber 4 based on the measuring value is connected to the optical sensor 14.

During pumping using the pumping system shown in FIG. 1, in a first phase the flat spring 12 affects the axle 10, and thereby the membrane 3, with a force, pulling the membrane 3 in a direction away from the pump chamber 4, whereby the volume of the pump chamber 4 expands and the first non-return valve 7 is opened so to allow the medium, to be pumped out of the vessel 6, to flow into the pump chamber 4. During this first phase, the membrane 3 is moved under the action of the spring 12 from one end position, here denominated second end position, to another end position, here denominated first end position. In a second phase the electromagnet 13 is activated, whereby the electromagnet 13 attracts the protruding part 11 of the axle 10 and the axle 10 is pushed in a direction towards the pump chamber 4, and the membrane 3 consequently also moves towards the pump chamber 4. The pump chamber 4 is thereby contracted and the medium flows out from the pump chamber 4 through the second non-return valve 9 and the outlet 8. During this second phase, the membrane 3 is moved under the action of the electromagnet 13 and against the action of the spring 12 from the first end position to the second end position.

Thus, it is the flat spring 12 that affects the membrane 3 to move in a direction away from the pump chamber 4, performing an expansion of said pump chamber 4 to pump medium from the vessel 6. It is also the stiffness of the flat spring 12 that limits the magnitude of the negative pressure that can be created in the vessel 6.

When the membrane 3 is in its first end position, the location of the membrane 3 is dependent upon the pressure in the pump chamber 4. The shadowing element 16 is connected to the membrane 3 and the location of the shadowing element 16 can be measured by the intensity of light reaching the optical sensor 14 from the light source 15, thereby giving said measuring value. Different pressure values for different measured measuring values are established in advance and for instance stored as a look-up table or a calculation model on a data storage medium in the processing means 17. The correlation between the pressure in the pump chamber 4 and the location of the first end position of the membrane 3 may be established empirically or by means of calculations.

Figure 2:
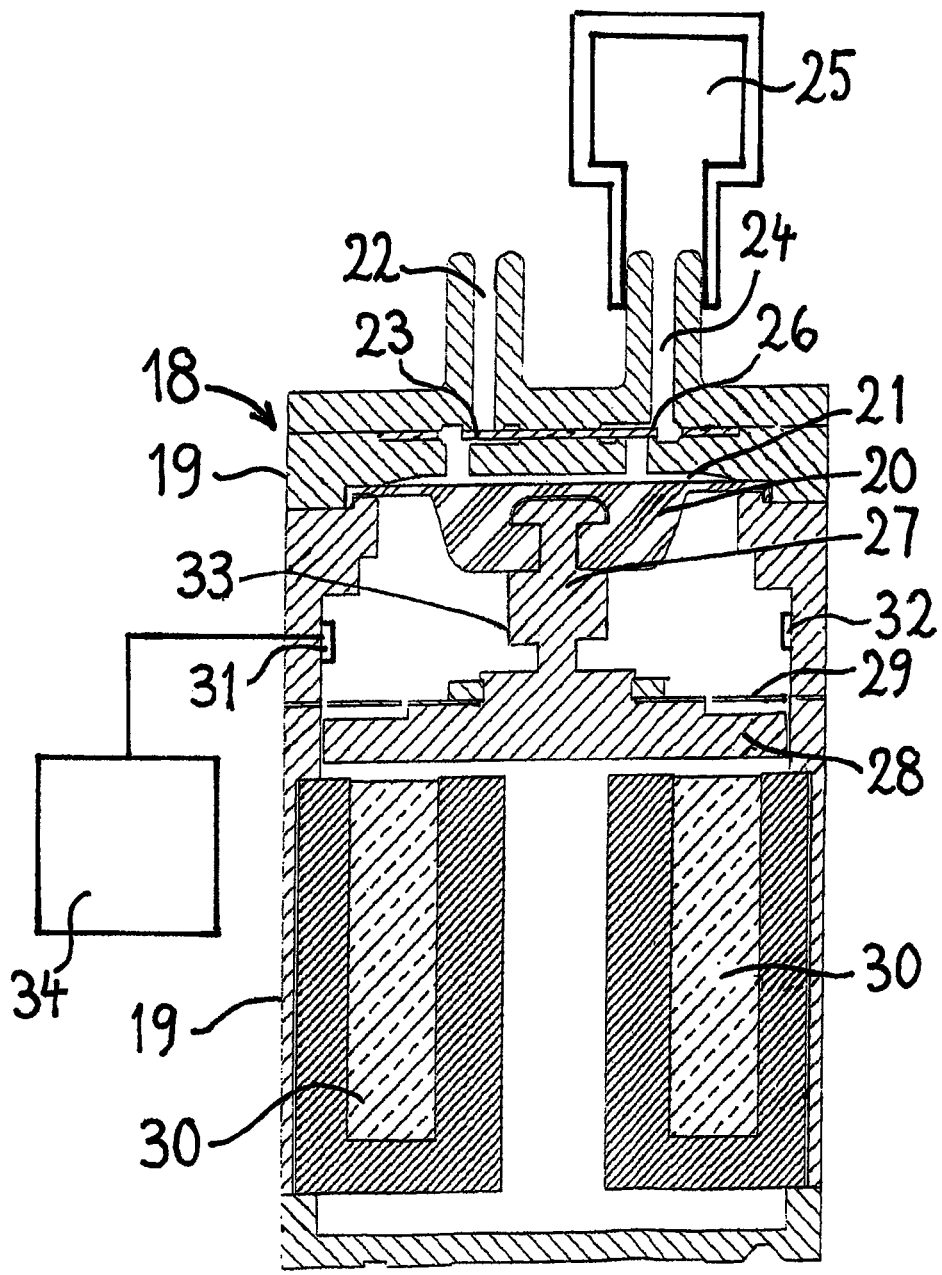
FIG. 2 shows a pumping system according to the invention, arranged to create a positive pressure in a vessel.

Another pumping system according to the invention is very schematically shown in FIG. 2. The pumping system comprises a membrane pump 18 comprising a pump housing 19 to which a membrane 20 is mounted. The membrane 20 delimits a pump chamber 21 inside the pump housing 19. The pump chamber 21 has an inlet 22 for feeding medium into the pump chamber 21 and a first non-return valve 23 is located between said inlet 22 and said pump chamber 21. The pump chamber 21 also has an outlet 24 for discharging medium out of the pump chamber 21 and into a vessel 25 connected to the outlet 24, and a second non-return valve 26 is located between the outlet 24 and the pump chamber 21. An axle 27 which has a protruding part 28 comprising a magnetic material is attached to the membrane 20. A flat spring 29 is attached to the axle 27, the spring 29 connecting the axle 27 with the pump housing 19. One side of the protruding part 28 of the axle 27 is facing an actuating member in the form of an electromagnet 30; this side of the protruding part 28 of the axle 27 is also facing away from the pump chamber 21. The pumping system also comprises sensing means for establishing a measuring value representing the location of the membrane 20. An optical sensor 31 and a light source 32 are placed in the pump housing 19 on the respectively opposite side of a shadowing element 33. In the present embodiment, the shadowing element 33 constitutes a part of the axle 27, but it can also be a separate element in contact with the membrane 20. Processing means 34, for instance a microprocessor, for establishing a pressure value representing the pressure inside the vessel 25 connected to the outlet 24 of the pump chamber 21 based on the measuring value is connected to the optical sensor 31.

During pumping using the pumping system shown in FIG. 2, in a first phase the flat spring 29 affects the axle 27, and thereby the membrane 20, with a force, pushing the membrane 20 in a direction towards the pump chamber 21, whereby the volume of the pump chamber 21 contracts and the second non-return valve 26 is opened so as to allow the medium, to be pumped into the vessel 25, to flow out of the pump chamber 21. During this first phase, the membrane 20 is moved under the action of the spring from one end position, here denominated second end position, to another end position, here denominated first end position. In a second phase the electromagnet 30 is activated, whereby the electromagnet 30 attracts the protruding part 28 of the axle 27 and the axle 27 is pulled in a direction away from the pump chamber 21, and the membrane 20 consequently also moves away from the pump chamber 21. The pump chamber 21 is thereby expanded and the medium flows into the pump chamber 21 through the first non-return valve 23 and the inlet 22. During this second phase, the membrane 20 is moved under the action of the electromagnet 30 and against the action of the spring 29 from the first end position to the second end position.

Thus, it is the flat spring 29 that affects the membrane 20 to move in a direction towards the pump chamber 21, performing a contraction of said pump chamber 21 to pump medium into the vessel 25. It is also the stiffness of the flat spring 29 that limits the magnitude of the positive pressure that can be created in the vessel 25.

When the membrane 20 is in its first end position, the location of the membrane 20 is dependent upon the pressure in the pump chamber 21. The shadowing element 33 is connected to the membrane 20 and the location of the shadowing element 33 can be measured by the intensity of light reaching the optical sensor 31 from the light source 32, thereby giving said measuring value. Different pressure values for different measured measuring values are established in advance and for instance stored as a look-up table or a calculation model on a data storage medium in the processing means 34. The correlation between the pressure in the pump chamber 21 and the location of the first end position of the membrane 20 may be established empirically or by means of calculations.

The invention is of course not in any way limited to the embodiments described above. On the contrary, several possibilities to modifications thereof should be apparent to a person skilled in the art without departing from the basic idea of the invention as defined in the appended claims.

The invention claimed is:

1. A pumping system comprising a membrane pump (1, 18) for pumping a medium into or out of a vessel (6, 25), the membrane pump (1, 18) comprising the combination of:

a pump housing (2, 19),
a membrane (3, 20), which is mounted to the pump housing (2, 19) and delimits a pump chamber (4, 21) inside the pump housing (2, 19),
an inlet (5, 22) for feeding medium into the pump chamber (4, 21), the inlet (5, 22) having a first non-return valve (7, 23) connected thereto,
an outlet (8, 24) for discharging medium from the pump chamber (4, 21), the outlet (8, 24) having a second non-return valve (9, 26) connected thereto, and
an actuating member (13, 30) for moving the membrane (3, 20) in a first direction from a first end position to a second end position against the action of a spring (12, 29), the membrane (3, 20) being movable in the opposite direction from the second end position to the first end position under the action of the spring (12, 29), wherein
the pumping system comprises a sensing device means (14, 31) for sensing and generating a measuring value representing the location of said first end position of the membrane (3, 20) when said pumping system is not pumping medium into or out of the vessel (6, 25),
a processing device (17, 34) for establishing a pressure value representing the pressure inside the vessel (6, 25) connected to the inlet (5) or outlet (24) of the pump chamber (4, 21) based on said measuring value,
said sensing and processing devices means together arranged and configured for establishing pressure in the vessel (6, 25) for different static positions of the membrane (3, 20) when the pumping system is not pumping medium into or out of the vessel (6,25), wherein the pressure is maintained within the pump chamber (4, 21) by only said spring (12, 29) acting on the membrane (3, 20), the vessel (6, 25) and one of the non-return valves (7,9; 23, 26) located at a port (8, 22) not connected with the vessel (6, 25).

2. A pumping system according to claim 1, wherein the membrane pump (18) is arranged to pump medium into the vessel (25) when the membrane (20) is moved from the second end position to the first end position under the action of the spring (29) to thereby create a positive pressure in the vessel (25).

3. A pumping system according t claim wherein the membrane pump (1) is arranged to pump medium out of the vessel (6) when the membrane (3) is moved from the second end position to the first end position under the action of the spring 12) to thereby create a negative pressure in the vessel (6).

4. A pumping system according to cairn 1, wherein the spring (5) is a flat spring.

5. A pumping system according to claim 1, wherein the sensing device (14, 31) comprises at least one optical sensor or another type of sensor.

6. A pumping system according to claim 5, wherein the sensing device comprises:
an optical sensor (14, 31) and a light source (15, 32) placed inside the pump housing (2, 19), and a shadowing element (16, 33) connected to the membrane (3, 20) and moving with the membrane (3, 20) during pumping, the shadowing element (t6, 33) being situated partially between the optical sensor (14, 31) and the light source (15, 32) to block light from the light source (15, 32) to reach the optical sensor (14, 31), the amount of light being blocked being dependent on the location of the shadowing element (16, 33) and thus also dependent on the location of the membrane (3, 20).

7. A method for establishing a pressure value representing the pressure in a vessel (6, 25) connected to an inlet (5, 22) or an outlet (8, 24) of a membrane pump (1, 18) comprising:
a pump housing (2, 19),
a membrane (3, 20), which is mounted to the pump housing (2, 19) and delimits a pump chamber (4, 21) inside the pump housing (2, 19),
the inlet (5, 22) for feeding medium into the pump chamber (4, 21), the inlet (5, 22) having a first non-return valve (7, 23) connected thereto,
the outlet (8, 24) for discharging medium from the pump chamber (4, 21), the outlet (8, 24) having a second non-return valve (9, 26) connected thereto, and
an actuating member (13, 30) for moving the membrane (3, 20) in a first direction from a first end position to a second end position against the action of a spring (12, 29), comprising the steps of
maintaining pressure within the pump chamber (4,21) by only said spring (12, 29) acting on the membrane (3, 20), the vessel (6, 25) and one (9, 23) of the non-return valves (7, 9; 23, 26) located at a port (8, 22) not connected with the vessel (6, 25) when not pumping medium into or out of the pump chamber (4, 21),
establishing a measuring value by sensing means (14, 31) representing a location of said first end position of the membrane (3, 20) when said pumping system is not pumping medium into or out of the vessel (6, 25), and
establishing a pressure value representing the pressure inside the vessel (6, 25) by processing means (17, 34) based on said measuring value for different static positions of the membrane (3, 20) when said pumping system is not pumping medium into or out of the vessel (6, 25).

8. A method according to claim 7, wherein the vessel (25) is connected to the outlet (24) of the pump chamber (21) and the membrane pump (18) is arranged to pump medium into the vessel (25) when the membrane (20) moves from the second end position to the first end position under the action of the spring (29) so as to thereby create a positive pressure in the vessel (25), wherein the processing means (34) generates, based on said measuring value, a pressure value representing the positive pressure inside the vessel (25).

9. A method according to claim 7, wherein the vessel (6) is connected to the inlet (5) of the pump chamber (4) and the membrane pump (1) is arranged to pump medium out of the vessel (6) when the membrane (3) moves from the second end position to the first end position under the action of the spring (12) to thereby create a negative pressure in the vessel (6), and the processing means (17) generates, based on said measuring value, a pressure value representing the negative pressure inside the vessel (6).

10. A method according to claim 7, wherein the generation of the measuring value is performed by sensing means (14, 31) comprising at least one optical sensor or inductive sensor.

11. A method according to claim 7, wherein the generation of the measuring value is performed by sensing means comprising:
an optical sensor (14, 31) and a light source (15, 32) placed inside the pump housing (2, 19), and
a shadowing element (16, 33) connected to the membrane (3, 20) and moving with the membrane (3, 20) during pumping, the shadowing element (16, 33) being situated partially between the optical sensor (14, 31) and the light source (15, 32) to partially block light from the light source (15, 32) to reach the optical sensor (14, 31), the measuring value being dependent on the light reaching the optical sensor (14, 31) from the light source (15, 32).

12. A method according to claim 9 comprising the additional step of establishing a volume value representing the volume of liquid in a vessel with a known inner volume, the membrane pump being arranged to pump a gaseous medium out of the vessel, by the steps of:

generating a first pressure value representing the negative pressure inside the vessel by the processing means at a first point of time, performing a certain number of pump strokes by the membrane pump between said first point of time and a second point of time, generating a second pressure value representing the negative pressure inside the vessel by the processing means at said second point of time, and establishing said volume value based on a comparison between said first pressure value and said second pressure value.

13. A pumping system according to claim 3, wherein the spring (5) is a flat spring.

14. A pumping system according to claim 13, wherein the sensing means (14, 31) comprising at least one optical sensor or another type of sensor.

15. A pumping system according to claim 4, wherein the sensing means (14, 31) comprising at least one optical sensor or another type of sensor.

16. A pumping system according to claim 3, wherein the sensing means (14, 31) comprising at least one optical sensor or another type of sensor.

17. A pumping system according to claim 16, wherein the sensing means comprises:

an optical sensor (14, 31) and a light source (15, 32) place inside the pump housing (2, 19), and a shadowing element (16, 33) connected to the membrane (3, 20) and moving with the membrane (3, 20) during pumping, the shadowing element (16, 33) being situated partially between the optical sensor (14, 31) and the light source (15, 32) to block light from the light source (15, 32) to reach the optical sensor (14, 31), the amount of light being blocked being dependent on the location of the shadowing element (16, 33) and thus also dependent on the location of the membrane (3, 20).

18. A pumping system according to claim 1, wherein said processing means (17, 34) comprise tabulated pressure values corresponding to specific measuring values stored as a look-up table or calculation model on a data storage medium within said processing means (17, 34).

19. The method according to claim 7, comprising the additional step of tabulating pressure values corresponding to specific measuring values and storing these values as a look-up table or calculation model on a data storage medium within said processing means (17, 34).

20. A pumping system according to claim 1, wherein the actuating member (13, 30) is an electromagnet.

* * * * *